United States Patent
Maciolek

(10) Patent No.: US 10,570,926 B2
(45) Date of Patent: Feb. 25, 2020

(54) VARIABLE-GEOMETRY DUCTED FAN

(71) Applicant: The Boeing Company, Chicago, IL (US)

(72) Inventor: Robert F. Maciolek, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 14/958,154

(22) Filed: Dec. 3, 2015

(65) Prior Publication Data

US 2017/0159674 A1 Jun. 8, 2017

(51) Int. Cl.
*F04D 29/56* (2006.01)
*B64D 33/04* (2006.01)
(Continued)

(52) U.S. Cl.
CPC .............. *F04D 29/563* (2013.01); *B64C 7/02* (2013.01); *B64C 11/001* (2013.01); *B64C 29/0033* (2013.01); *B64D 33/04* (2013.01); *B64D 35/04* (2013.01); *F04D 19/002* (2013.01); *F04D 29/547* (2013.01); *F02K 1/12* (2013.01); *F05B 2220/90* (2013.01); *F05B 2240/123* (2013.01); *F05B 2250/02* (2013.01)

(58) Field of Classification Search
CPC ............ B64C 29/0041; B64C 29/0058; B64C 29/0075; B64C 29/0033; B64C 7/02; B64C 2201/088; B64D 33/04; B64D 33/06; F04C 29/547; F04C 2250/02; F02K 1/30; F02K 1/08; F02K 1/1207; F02K 1/10; F02K 1/12; F02K 1/06; F02K 1/1253; F02K 1/1261; F04D 29/547; F04D 2250/02; F05B 2240/123; F05B 2250/02

See application file for complete search history.

(56) References Cited

U.S. PATENT DOCUMENTS 2,595,504 A 5/1952 Avery
2,634,578 A * 4/1953 Kallal ........................ F02K 1/10
239/265.39

(Continued)

FOREIGN PATENT DOCUMENTS

EP 2 336 022 6/2011
EP 2 927 122 10/2015
(Continued)

OTHER PUBLICATIONS

Doak VZ-4DA (U.S. Army experimental aircraft built and flight-tested between 1958 and 1962 (see https://en.wikipedia.org/wiki/Doak_VZ-4).

(Continued)

*Primary Examiner* — Christopher D Hutchens
(74) *Attorney, Agent, or Firm* — Walters & Wasylyna LLC

(57) ABSTRACT

A variable-geometry ducted fan may include an air duct having a longitudinal axis, the air duct including an inlet of the variable-geometry ducted fan, a fan rotatably mounted within the air duct downstream from the inlet, the fan including fan blades defining a fan area, and a variable-area nozzle coupled to the air duct downstream from the fan, the variable-area nozzle including an exhaust of the variable-geometry ducted fan having a variable exhaust area.

29 Claims, 11 Drawing Sheets

(51) Int. Cl.
    *B64D 35/04*     (2006.01)
    *B64C 7/02*     (2006.01)
    *B64C 11/00*     (2006.01)
    *B64C 29/00*     (2006.01)
    *F04D 19/00*     (2006.01)
    *F04D 29/54*     (2006.01)
    *F02K 1/12*     (2006.01)

(56) References Cited

U.S. PATENT DOCUMENTS

| | | | | |
|---|---|---|---|---|
| 2,693,078 | A * | 11/1954 | Laucher | B27B 5/10 239/265.39 |
| 2,780,424 | A * | 2/1957 | Price | B64C 29/0075 244/12.4 |
| 2,796,731 | A * | 6/1957 | Morely et al. | F02K 1/1207 239/127.3 |
| 2,800,766 | A * | 7/1957 | Hemsworth | F02K 1/06 138/45 |
| 2,944,395 | A * | 7/1960 | Doak | B64C 9/38 239/265.29 |
| 2,978,061 | A * | 4/1961 | Keen | F02K 1/1207 181/215 |
| 3,061,242 | A * | 10/1962 | Zurawinski | B64C 29/0033 244/23 A |
| 3,184,183 | A | 5/1965 | Plasecki et al. | |
| 3,231,197 | A * | 1/1966 | Strom | F02K 1/10 138/111 |
| 3,263,417 | A * | 8/1966 | Hooker | F02K 1/12 244/207 |
| 3,319,892 | A * | 5/1967 | Zirin | B64C 29/0066 239/265.35 |
| 3,544,042 | A * | 12/1970 | Soulez-Lariviere | B64C 29/0033 244/12.4 |
| 3,622,075 | A * | 11/1971 | Harris | F02K 1/1207 239/265.19 |
| 3,892,358 | A * | 7/1975 | Gisslen | F02K 1/12 239/265.39 |
| 4,074,859 | A * | 2/1978 | Lowman, Jr. | B64D 33/04 239/265.33 |
| 4,492,353 | A * | 1/1985 | Phillips | B64C 29/0075 244/12.4 |
| 4,804,155 | A * | 2/1989 | Strumbos | B64C 25/423 244/12.6 |
| 4,850,535 | A * | 7/1989 | Ivie | A63H 27/02 239/265.39 |
| 5,131,604 | A | 7/1992 | Yoerkie, Jr. et al. | |
| 5,221,048 | A | 6/1993 | Lair | |
| 5,232,158 | A * | 8/1993 | Barcza | F02K 1/805 239/265.35 |
| 5,295,645 | A * | 3/1994 | Rozmus | F02K 1/1207 239/265.39 |
| 5,419,514 | A * | 5/1995 | Ducan | B64C 29/0033 244/12.4 |
| 5,634,611 | A | 6/1997 | Marze et al. | |
| 5,782,432 | A * | 7/1998 | Renshaw | B64D 33/04 239/265.19 |
| 7,458,221 | B1 * | 12/2008 | Arnold | F02K 1/1207 181/213 |
| 7,721,551 | B2 | 5/2010 | Hanson | |
| 9,694,906 | B1 * | 7/2017 | Sadek | B64C 29/00 |
| 2004/0026563 | A1 | 2/2004 | Moller | |
| 2006/0097107 | A1 | 5/2006 | Parks et al. | |
| 2006/0150612 | A1 * | 7/2006 | Anderson | F02K 1/002 60/204 |
| 2010/0018212 | A1 * | 1/2010 | Core | B64D 33/06 60/771 |
| 2011/0001017 | A1 | 1/2011 | Burdisso | |
| 2012/0234968 | A1 * | 9/2012 | Smith | B64C 29/0033 244/12.3 |
| 2012/0275905 | A1 * | 11/2012 | Ambrose | F02K 9/80 415/148 |
| 2014/0027538 | A1 * | 1/2014 | Webster | F02K 1/06 239/265.43 |
| 2014/0142898 | A1 * | 5/2014 | Nanda | F01D 25/30 703/1 |
| 2017/0145955 | A1 * | 5/2017 | Baker | F02K 1/123 |

FOREIGN PATENT DOCUMENTS

| | | | | |
|---|---|---|---|---|
| FR | 2145362 | A1 * | 2/1973 | F02K 1/12 |
| GB | 978041 | | 12/1964 | |

OTHER PUBLICATIONS

Bell X-22 (U.S. Army experimental aircraft built and flight-tested between 1966 and 1967 (see https://en.wikipedia.org/wiki/Bell_X-22).
European Patent Office, Extended European Search Report, EP 16 19 3111 (dated May 11, 2017).
The State Intellectual Property Office of the People's Republic of China, Office Action, with English translation, App. No. 2016110776997 (dated Jul. 29, 2019).
The State Intellectual Property Office of the People's Republic of China, Office Action, App. No. 2016110776997 (dated Sep. 5, 2019).
China National Intellectual Property Administration, Office Action, with English translation, App. No. 201611077699.7 (dated Nov. 20, 2019).
China National Intellectual Property Administration, Office Action, App. No. 201611077699.7 (dated Dec. 11, 2019).
Patent Office of the Cooperation Council for the Arab States of the Gulf, Examination Report, with English translation, App. No. GC 2016-32478 (dated Nov. 18, 2019).

* cited by examiner

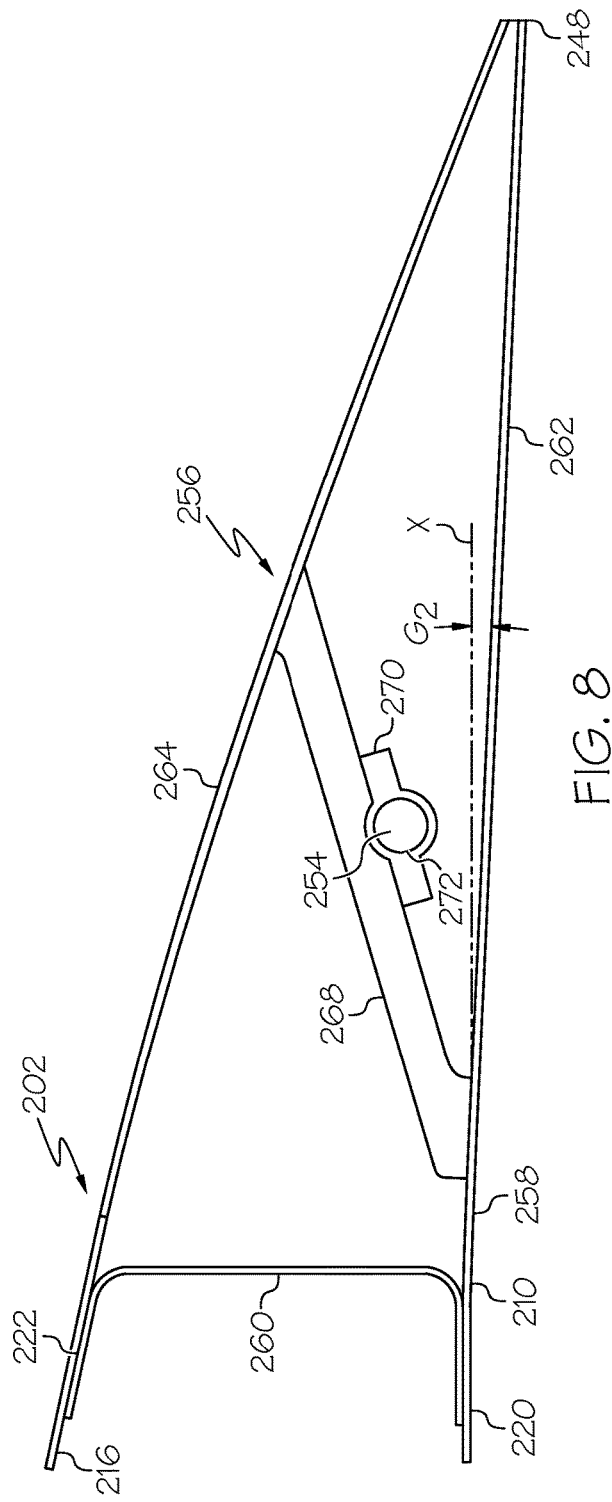
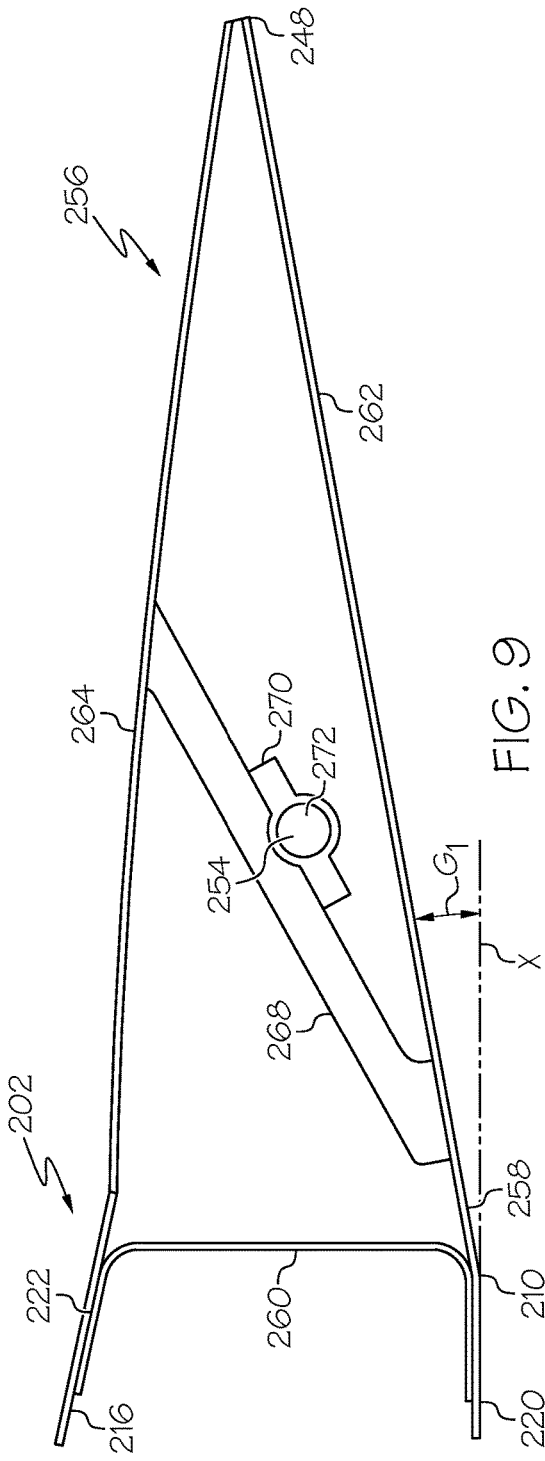
FIG. 8
FIG. 9

VARIABLE-GEOMETRY DUCTED FAN

GOVERNMENT RIGHTS

This invention was made with government support under contract number HR0011-14-9-0002 awarded by the Defense Advanced Research Projects Agency. The government has certain rights in this invention.

FIELD

The present disclosure is generally related to ducted fans for air vehicles and, more particularly, to a variable-geometry ducted fan for vertical take-off and landing air vehicles.

BACKGROUND

Ducted fan air vehicles may include at least one ducted fan and an engine to drive the fan inside the air duct of the ducted fan. A ducted fan air vehicle may have the ability of forward flight and stationary hovering. For example, ducted fans are known to be used with vertical take-off and landing ("VTOL") air vehicles. However, while ducted fans may enable both horizontal and vertical flight, a traditional design requires compromise in the design features for each flight mode (e.g., horizontal and vertical flight) in order to meet overall aerodynamic performance requirements in a balanced manner. The many constraints preclude a design that maximizes aerodynamic efficiency in each operational flight mode. Thus, the aerodynamic efficiency of both flight modes suffers.

Accordingly, those skilled in the art continue with research and development efforts in the field of ducted fan propulsion.

SUMMARY

In one example, the disclosed variable-geometry ducted fan may include an air duct having a longitudinal axis, the air duct including an inlet of the variable-geometry ducted fan, a fan rotatably mounted within the air duct downstream from the inlet, the fan including fan blades defining a fan area, and a variable-area nozzle coupled to the air duct downstream from the fan, the variable-area nozzle including an exhaust of the variable-geometry ducted fan having a variable exhaust area.

In another example, the disclosed aircraft may include a vehicle body, and at least one variable-geometry ducted fan coupled to the vehicle body, wherein the variable-geometry ducted fan is rotatable between an approximately vertical orientation and an approximately horizontal orientation, and wherein the variable-geometry ducted fan includes an air duct having a longitudinal axis, the air duct including an inlet of the variable-geometry ducted fan, a fan rotatably mounted within the air duct downstream from the inlet, the fan including fan blades defining a fan area, and a variable-area nozzle coupled to the air duct downstream from the fan, the variable-area nozzle including an exhaust of the variable-geometry ducted fan having a variable exhaust area.

In yet another example, the disclosed method may include the steps of: (1) positioning a variable-geometry ducted fan in one of an approximately vertical orientation or an approximately horizontal orientation, the variable-geometry ducted fan including an air duct including an inlet of the variable-geometry ducted fan, a fan rotatably mounted within the air duct downstream from the inlet, and a variable-area nozzle coupled to the air duct downstream from the fan and including an exhaust of the variable-geometry ducted fan, (2) one of expanding the variable-area nozzle relative to a longitudinal axis of the variable-geometry ducted fan to increase an exhaust area of the exhaust when the variable-geometry ducted fan is in the approximately vertical orientation for vertical flight, or contracting the variable-area nozzle relative to the longitudinal axis of the variable-geometry ducted fan to decrease the exhaust area of the exhaust when the variable-geometry ducted fan is in the approximately horizontal orientation for horizontal flight, (3) drawing air into the variable-geometry ducted fan through the inlet, (4) moving the air through the variable-area nozzle, and (5) exiting the air from the variable-geometry ducted fan through the exhaust to generate thrust suitable to enable one of the vertical flight or the horizontal flight depending upon the orientation of the variable-geometry ducted fan.

Other examples of the disclosed apparatus and method will become apparent from the following detailed description, the accompanying drawings and the appended claims.

BRIEF DESCRIPTION OF THE DRAWINGS

FIG. 8 is a schematic side elevation view, in section, of one example of a pedal of the variable-area nozzle shown pivoted radially inward to decrease the exhaust area of the disclosed variable-geometry ducted fan;

FIG. 9 is a schematic side elevation view, in section, of one example of the pedal of the variable-area nozzle shown pivoted radially outward to increase the exhaust area of the disclosed variable-geometry ducted fan;

DETAILED DESCRIPTION

Figure 1:
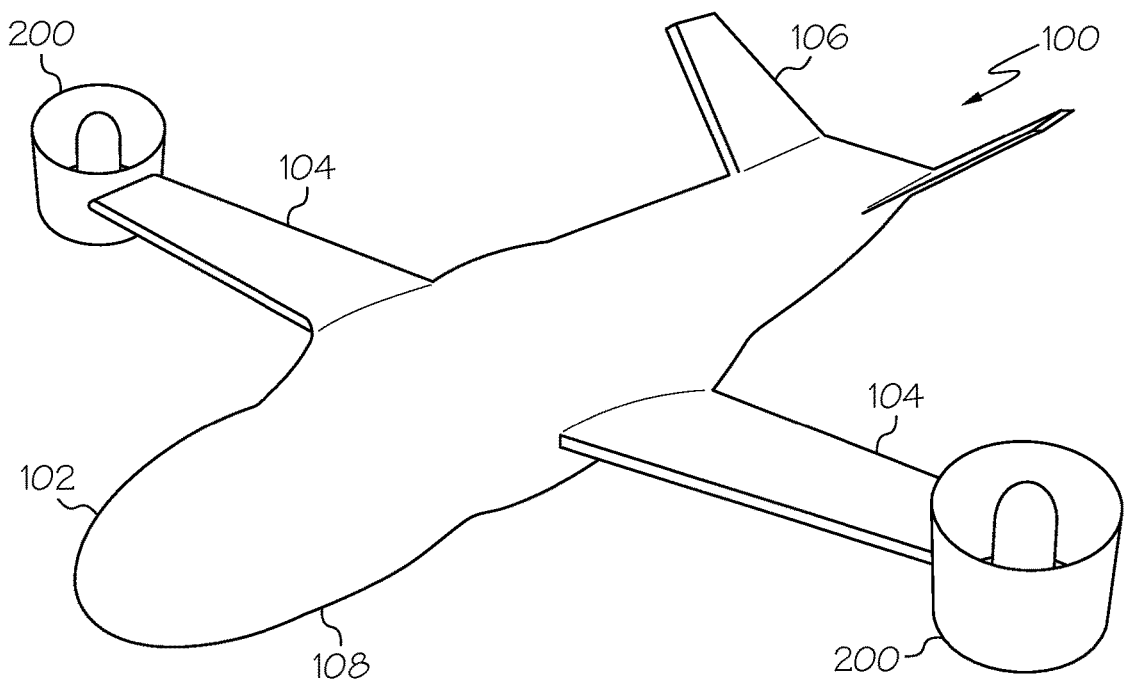
FIG. 1 is a schematic perspective view of one example of an aircraft provided with a variable-geometry ducted fan, where the variable-geometry ducted fan is in a vertical-flight mode.

The following detailed description refers to the accompanying drawings, which illustrate specific examples of embodiments or implementations described in the disclosure. Other examples having different structures and operations do not depart from the scope of the present disclosure. Like reference numerals may refer to the same element or component in the different drawings.

Figure 14:
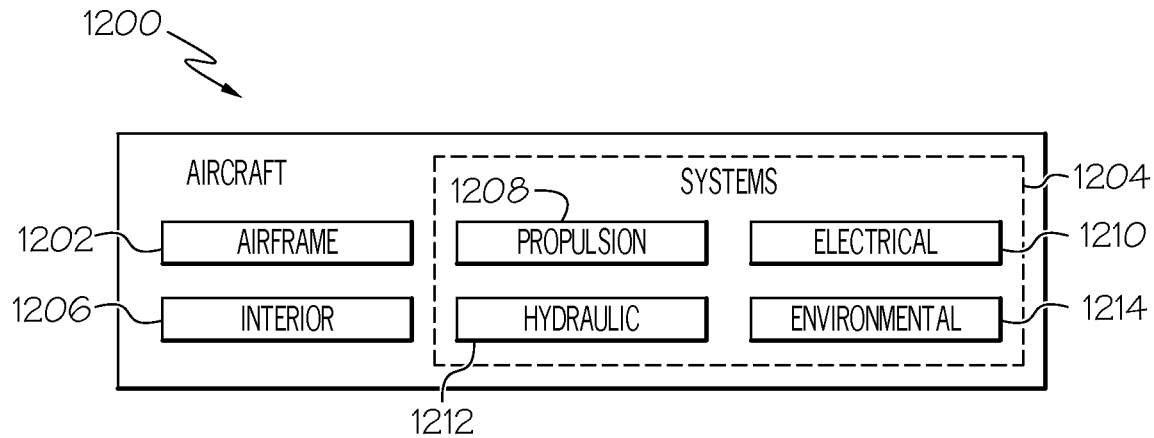
FIG. 14 is a schematic illustration of an aircraft.

In FIG. 14, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting the blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 14 may be combined in various ways without the need to include other features described in FIG. 14, other drawing figures, and/or the accompanying disclosure, even though such combination or combinations are not explicitly illustrated herein. Similarly, additional features not limited to the examples presented, may be combined with some or all of the features shown and described herein.

Figure 12:
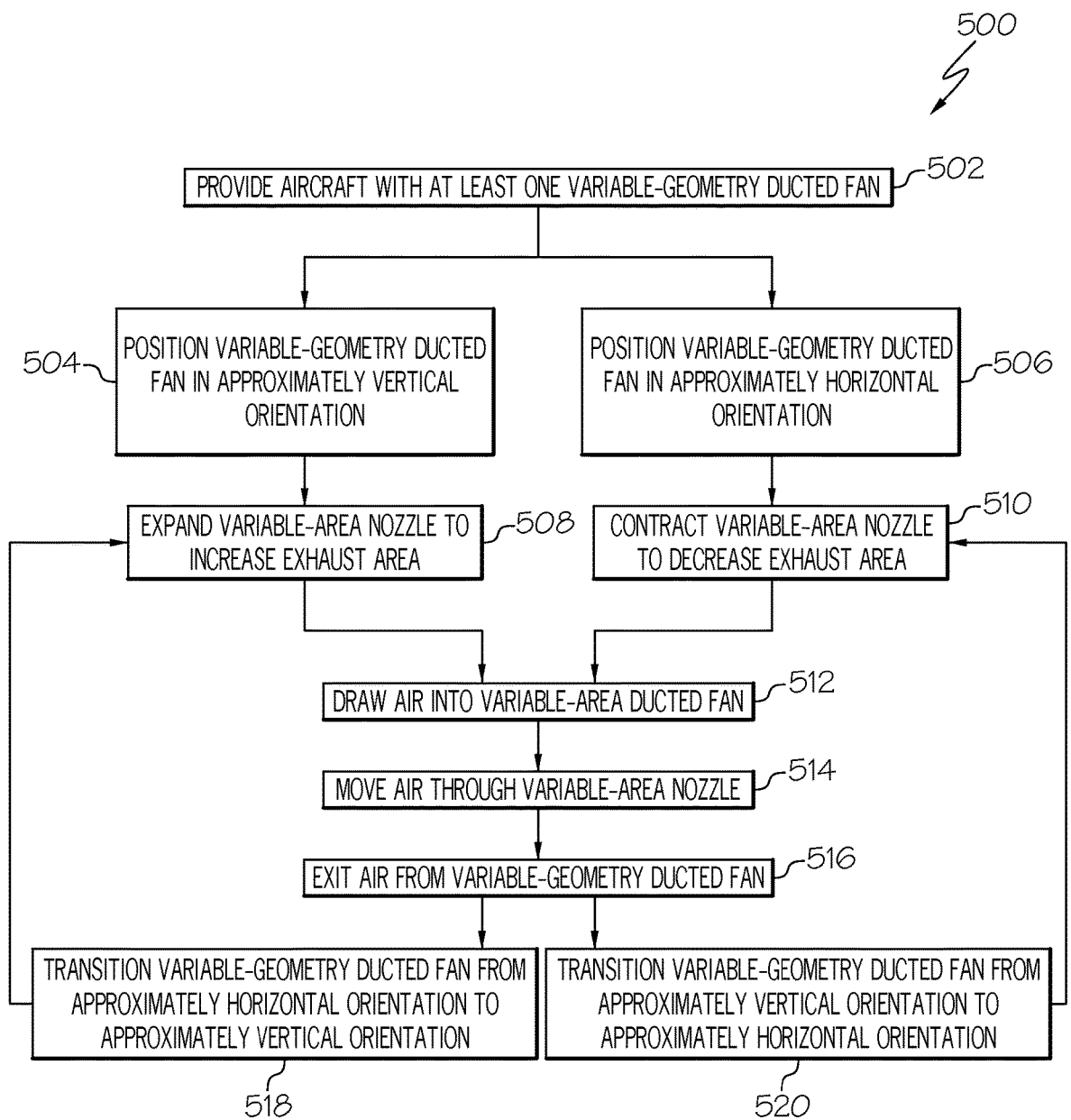
FIG. 12 is a flow diagram of one example of a disclosed method for increasing aerodynamic efficiency of an aircraft in the vertical-flight mode and the horizontal-flight mode using the disclosed variable-geometry ducted fan.
Figure 13:
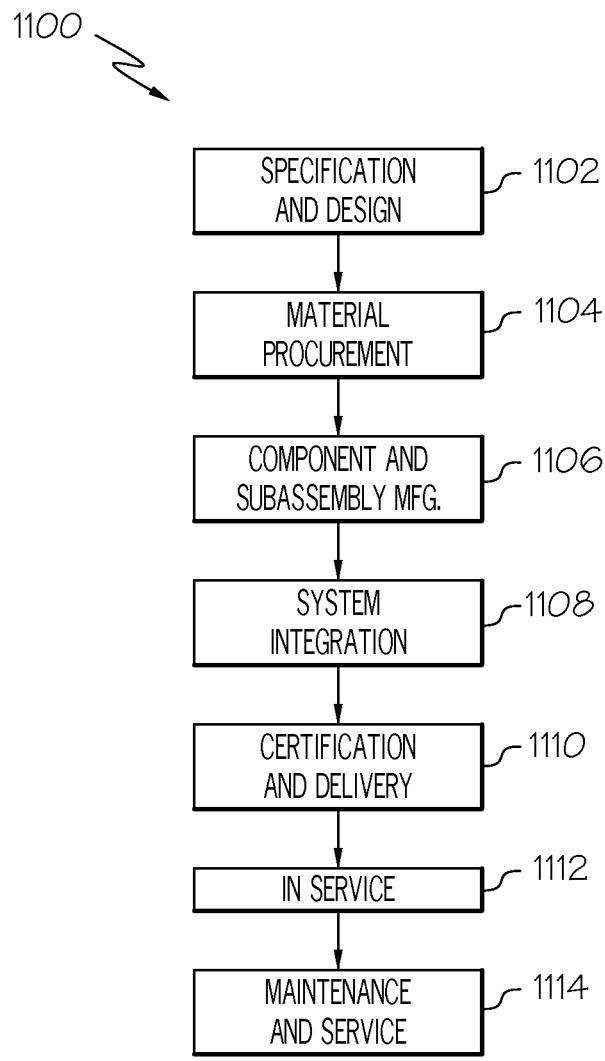
FIG. 13 is a block diagram of aircraft production and service methodology.

In FIGS. 12 and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12 and 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

Reference herein to "example," "one example," "another example," or similar language means that one or more feature, structure, or characteristic described in connection with the example is included in at least one embodiment or implementation. Thus, the phrases "in one example," "as one example," and similar language throughout the present disclosure may, but do not necessarily, refer to the same example. Illustrative, non-exhaustive examples, which may be, but are not necessarily, claimed, of the subject matter according the present disclosure are provided below.

Figure 2:
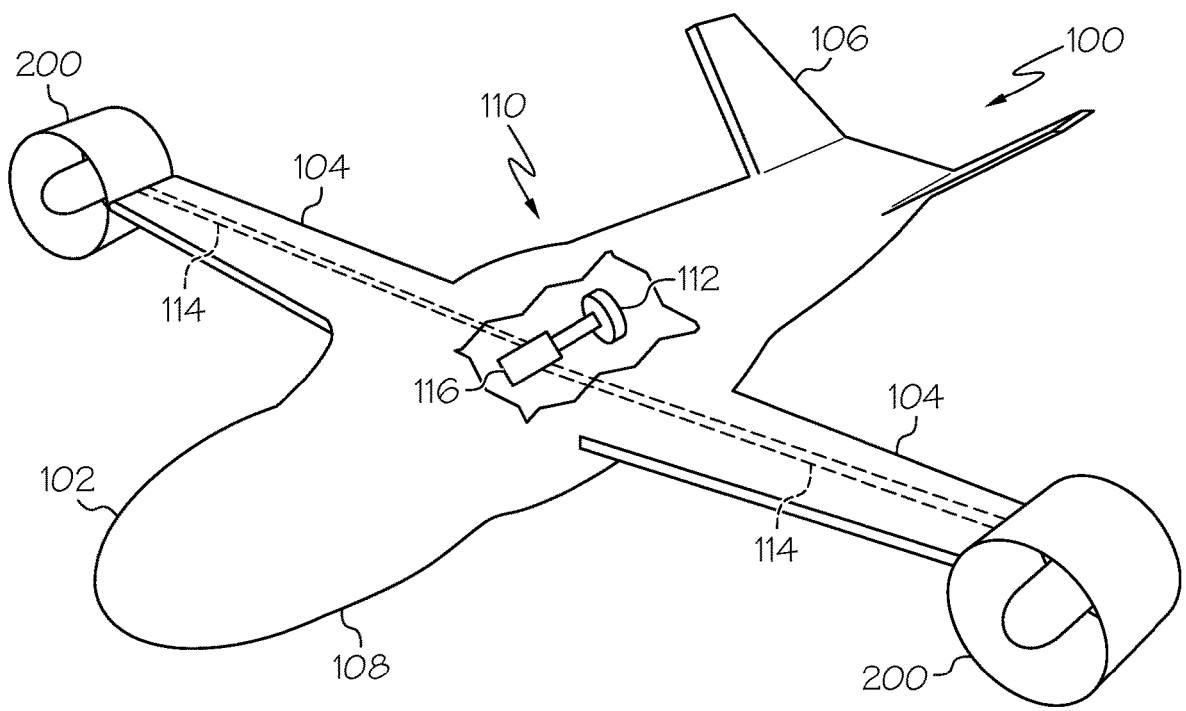
FIG. 2 is a schematic perspective view of the aircraft provided with the variable-geometry ducted fan, where the variable-geometry ducted fan is in a horizontal-flight mode.

Referring to FIGS. 1 and 2, one example of aircraft 100 provided with the disclosed variable-geometry ducted fan 200 is disclosed. Generally, aircraft 100 may be any air vehicle that utilizes at least one variable-geometry ducted fan 200 to generate thrust suitable to enable flight. As one example, and as illustrated in FIGS. 1 and 2, aircraft 100 is a fixed-wing aircraft. Aircraft 100 may be manned or unmanned (e.g., an unmanned aerial vehicle ("UAV")). Aircraft 100 may include vehicle body 102. As one example, vehicle body 102 includes fuselage 108, wings 104, and one or more stabilizers 106 (e.g., vertical and/or horizontal stabilizers). As one example, one variable-geometry ducted fan 200 is mounted to an end of each one of wings 104. Other mounting locations and/or configurations of variable-geometry ducted fan 200 are also contemplated, such as being mounted to an intermediate location on each one of wings 104, being enclosed within each one of wings 104, and the like.

Aircraft 100 is capable of vertical take-off and landing ("VTOL"), such that aircraft 100 can hover, take-off, and land vertically (e.g., a VTOL aircraft). Thus, aircraft 100 may operate in both a horizontal axial flight mode and a vertical axial flight mode (e.g., hovering, vertical take-off, and vertical landing). Aircraft 100 may also be capable of other operational modes such as conventional take-off and landing ("CTOL"), short take-off and landing ("STOL") and/or short take-off and vertical landing ("STOVL").

Aircraft 100 is configured to move (e.g., tilt or rotate) variable-geometry ducted fan 200 between an approximately vertical orientation, as illustrated in FIG. 1, and an approximately horizontal orientation, as illustrated in FIG. 2. Thus, variable-geometry ducted fan 200 is rotatable between a vertical-flight mode, in which variable-geometry ducted fan 200 is positioned approximately vertical, and horizontal-flight mode, in which variable-geometry ducted fan 200 is positioned approximately horizontal. As one example, and as illustrated in FIGS. 1 and 2, variable-geometry ducted fan 200 may be rotatably coupled to each one of wings 104 (e.g., the end of each wing 104) and aircraft 100 may tilt variable-geometry ducted fan 200 approximately vertical for VTOL (FIG. 1) and tilt variable-geometry ducted fan 200 approximately horizontal (e.g., forward) for horizontal wing-borne flight (FIG. 2), while wings 104 remain fixed in place. As one example (not explicitly illustrated), variable-geometry ducted fan 200 may be fixedly coupled to each one of wings 104 and aircraft 100 may tilt the entire wing assembly (e.g., wing 104 and variable-geometry ducted fan 200) between the vertical-flight orientation and the horizontal-flight orientation.

While the example aircraft 100 illustrated in FIGS. 1 and 2 includes two variable-geometry ducted fans 200, in other non-illustrated examples, aircraft 100 may include only one variable-geometry ducted fan 200 or more than two variable-geometry ducted fans 200. Additionally, other examples of aircraft 100 may include additional types of propulsion devices (e.g., a jet engine, a turbofan engine, a powdered rotor, etc.) used in addition to or in combination with variable-geometry ducted fan 200.

Figure 3:
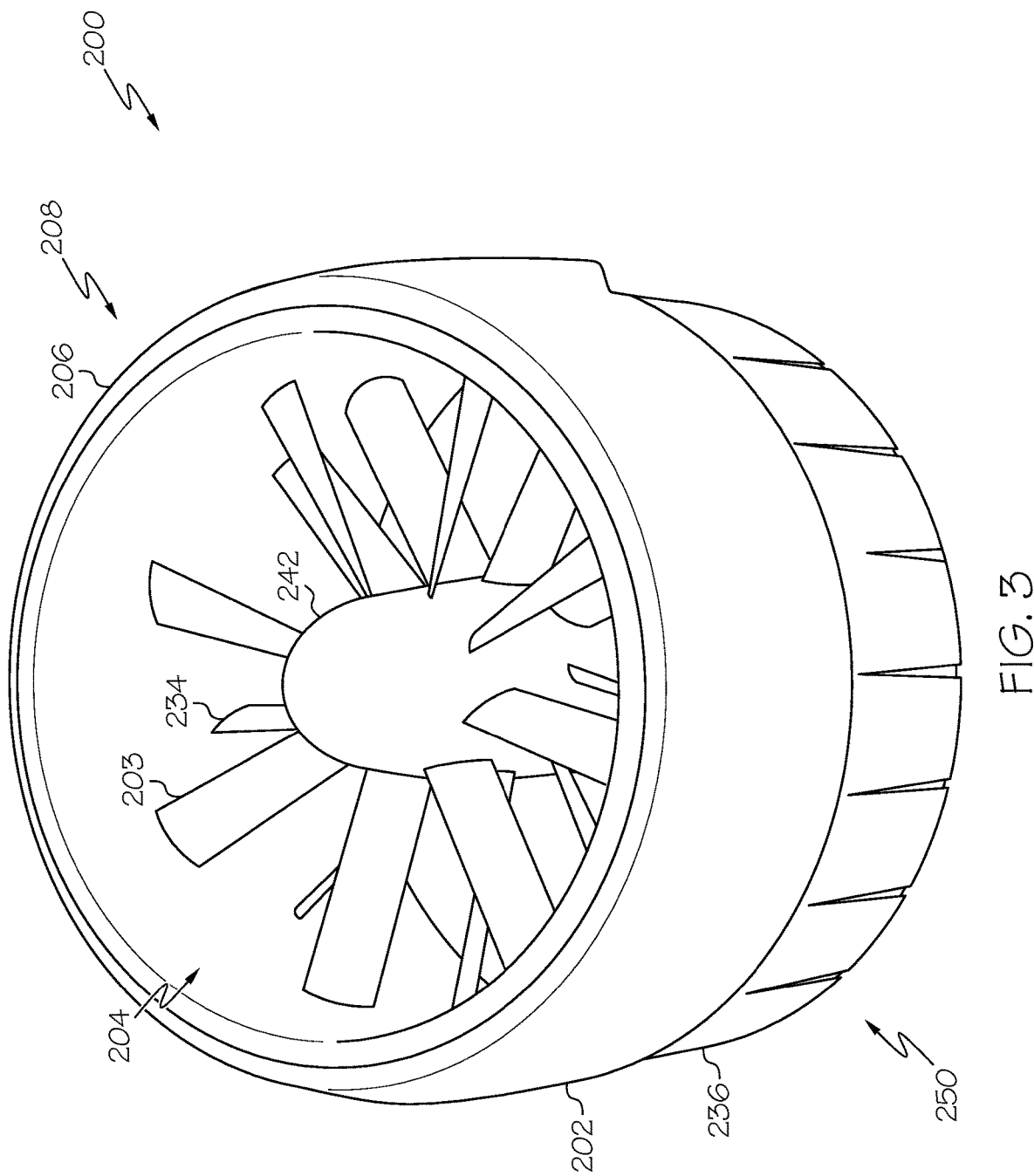
FIG. 3 is a schematic perspective view of one example of the disclosed variable-geometry ducted fan.

Referring to FIG. 3, and with reference to FIGS. 1 and 2, one example of variable-geometry ducted fan 200 for aircraft 100 is disclosed. Variable-geometry ducted fan 200 is designed to achieve high aerodynamic efficiency in both hovering flight (e.g., vertical flight) and high-speed cruising flight (e.g., horizontal flight at speeds of up to approximately 350 knots). As will be described in more detail herein, variable-geometry ducted fan 200 includes a variable (e.g., adaptable) exhaust geometry configured to optimize fan airflow during a specific flight mode (e.g., vertical flight or horizontal flight). Varying exhaust geometry changes the exhaust area. Variable-geometry ducted fan 200 includes a fixed inlet geometry configured to generate a large amount of thrust in hover mode, possess low surface velocities in high-speed cruise mode and be separation-free during transition between the vertical and horizontal flight modes.

Figure 4:
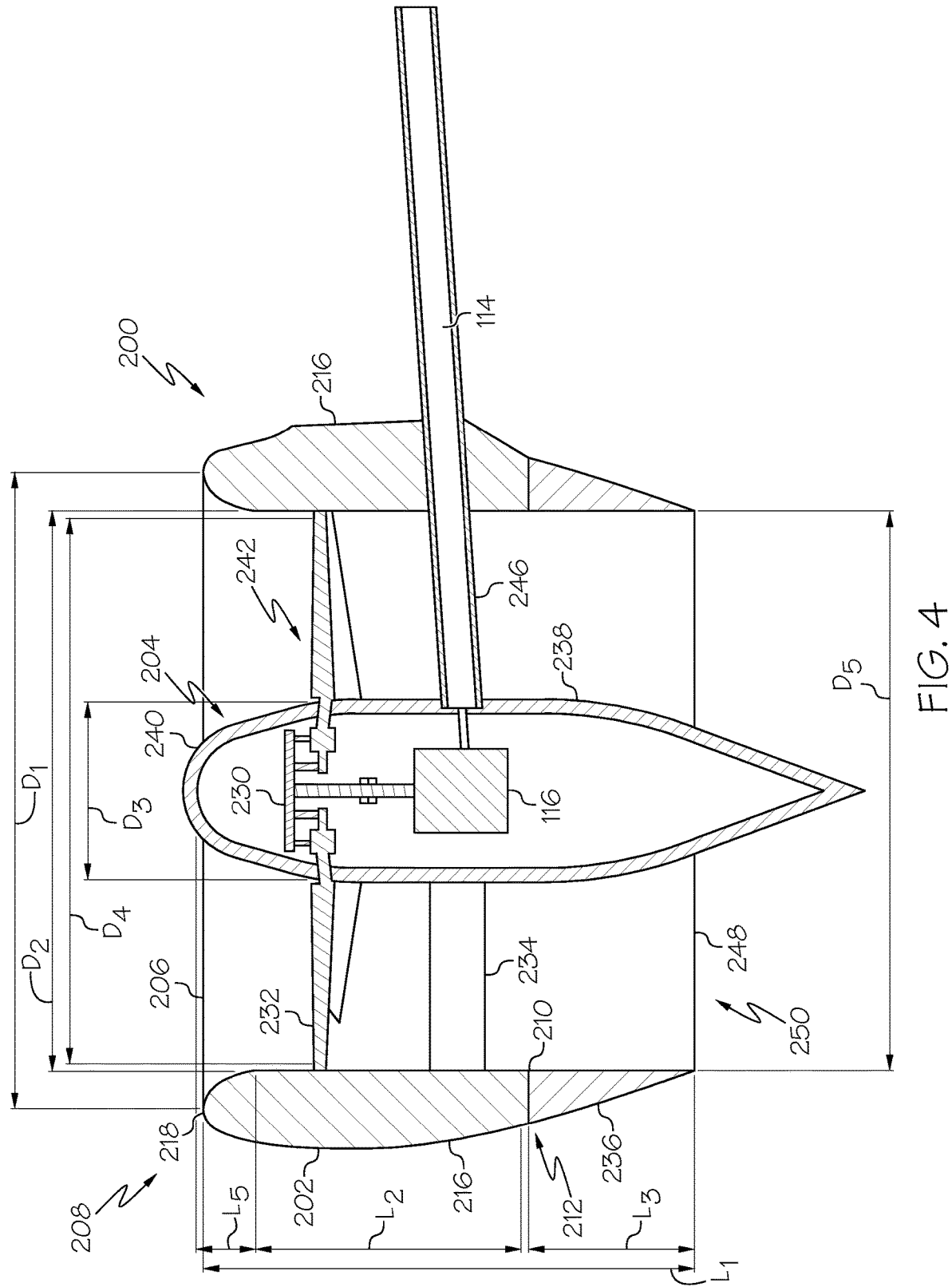
FIG. 4 is a schematic side elevation view, in section, of one example of the disclosed variable-geometry ducted fan.

Referring to FIG. 4, and with reference to FIG. 3, variable-geometry ducted fan 200 includes air duct 202, fan 204 located inside air duct 202, and variable-area nozzle 236 coupled to air duct 202. Variable-geometry ducted fan 200 includes an overall length $L_1$. Air duct 202 includes a length $L_2$ defining a portion of the overall length $L_1$ of variable-geometry ducted fan 200. Variable-area nozzle 236 includes a length $L_3$ defining a portion of the overall length $L_1$ of variable-geometry ducted fan 200. As one specific, non-limiting example, length $L_3$ of variable-area nozzle 236 is approximately thirty percent of the overall length $L_1$ of variable-geometry ducted fan 200. As one specific, non-limiting example, length $L_3$ of variable-area nozzle 236 is approximately thirty-five percent of the overall length $L_1$ of variable-geometry ducted fan 200. As one specific, non-limiting example, length $L_3$ of variable-area nozzle 236 is approximately forty percent of the overall length $L_1$ of variable-geometry ducted fan 200. As one specific, non-limiting example, length $L_3$ of variable-area nozzle 236 is approximately forty-five percent of the overall length $L_1$ of variable-geometry ducted fan 200.

Air duct 202 includes an approximately cylindrical body including duct wall 216, inlet (e.g., first) end 208, and outlet (e.g., second) end 212 (FIG. 4) longitudinally opposed to inlet end 208. An approximately circular inlet aperture or opening at inlet end 208 of air duct 202 forms inlet 206 of air duct 202. Inlet 206 also refers to (defines) the inlet of variable-geometry ducted fan 200 (e.g., inlet 206 of variable-geometry ducted fan 200). An approximately circular outlet aperture or opening at outlet end 212 of air duct 202 forms outlet 210 (FIG. 4) of air duct 202.

Figure 5:
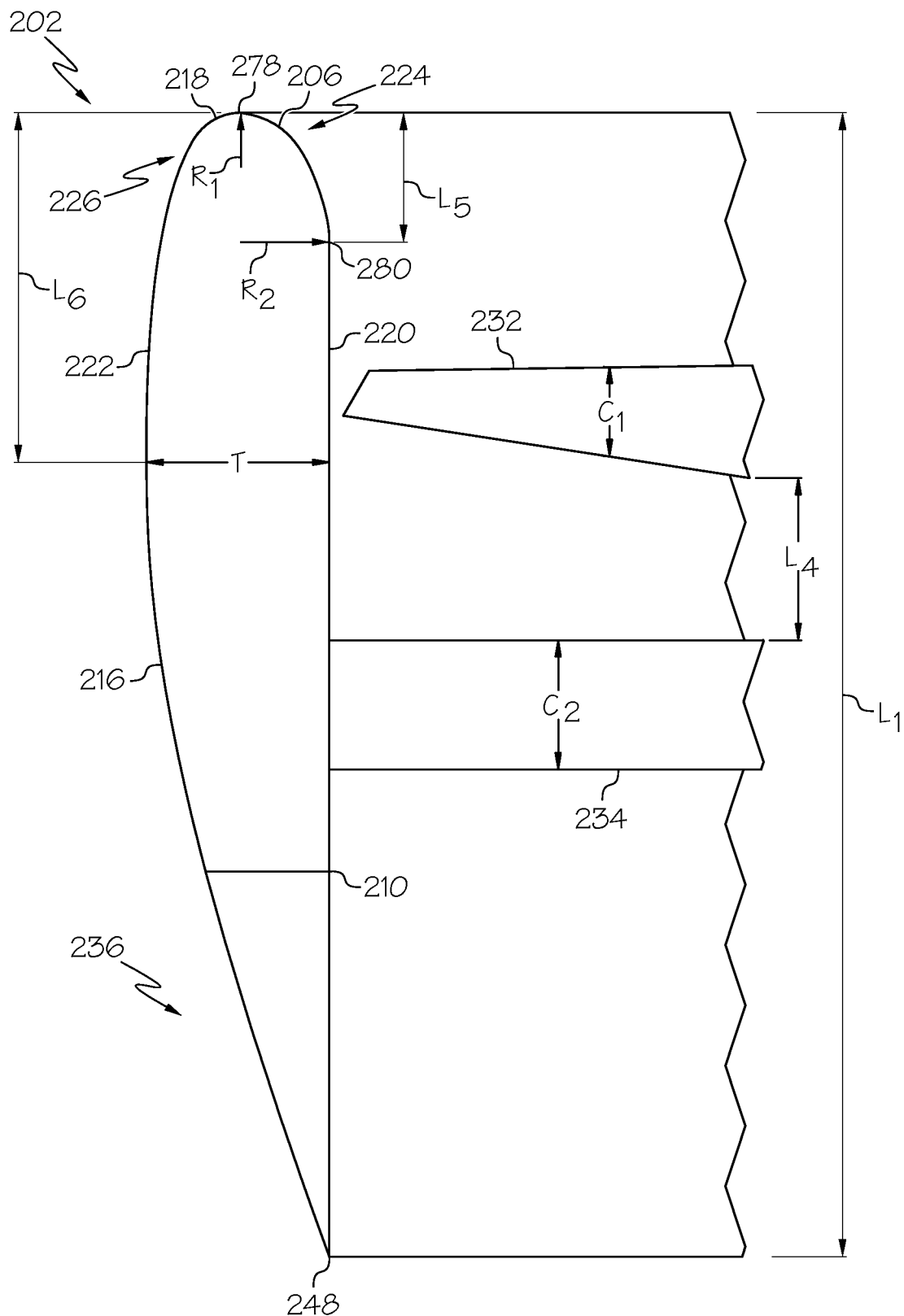
FIG. 5 is a schematic side elevation view, in section, of one example of a duct wall of an air duct of the disclosed variable-geometry ducted fan.

Referring to FIG. 4, and with reference to FIG. 5, air duct 202 includes a highlight diameter $D_1$ at inlet 206. The highlight diameter $D_1$ refers to a distance between opposed highlight points 278 (FIG. 5) of duct inlet lip 218. Each highlight point 278 refers to a position of a forwardmost point of duct inlet lip 218, for example, at an approximately center location of duct inlet lip 218. The highlight diameter $D_1$ of inlet 206 defines a highlight area $A_1$ of variable-geometry ducted fan 200 at a highlight plane (e.g., a plane shared by the positions of highlight points 278). A throat of air duct 202 (and of variable-geometry ducted fan 200) includes a throat diameter $D_2$. The throat diameter $D_2$ refers to a distance between opposed throat points 280 (FIG. 5). Each throat point 280 refers to a forwardmost point of the throat of air duct 202, for example, proximate (e.g., at or near) inlet end 208, for example, proximate inlet 206. As one example, throat points 280 (e.g., the point where the throat of air duct 202 (and of variable-geometry ducted fan 200) begins) is located at an aft end of inner wall transition-portion 224 (FIG. 5), for example, proximate an intersection between inner wall transition-portion 224 and the approximately flat surface of inner wall 220. The throat diameter $D_2$ of inlet 206 defines a throat area $A_2$ (not explicitly illustrated) of air duct 202 (and of variable-geometry ducted fan 200) at a throat plane (e.g., a plane shared by the position of throat points 280). In one specific, non-limiting example, a contraction ratio of inlet 206, defined by $(D_1/D_2)^2$, is approximately 1.30.

In one example, air duct 202 includes a constant diameter along the length $L_2$ (FIG. 4). This portion of air duct 202 contains fan 204. As one example, fan 204 is a variable-pitch fan. Fan 204 includes a fan diameter $D_4$. Fan diameter $D_4$ of fan 204 is approximately equal to the throat diameter $D_2$ at inlet 206. In one specific, non-limiting example, the ratio of inlet throat diameter to fan diameter $(D_2/D_4)$ is unity. In one example, the ratio of the overall length $L_1$ of variable-geometry ducted fan 200 to fan diameter $D_4$ (e.g., $L_1/D_4$) is approximately 0.875.

As used throughout the present disclosure, inlet end 208 of air duct 202 may be referring to a forward end of air duct 202, when variable-geometry ducted fan 200 is in the horizontal-flight orientation (FIG. 2), or a top end of air duct 202, when variable-geometry ducted fan 200 is in the vertical-flight orientation (FIG. 1). Similarly, as used throughout the present disclosure, outlet end 212 of air duct 202 may be referring to an aft end of air duct 202, when variable-geometry ducted fan 200 is in the horizontal-flight orientation, or a bottom end of air duct 202, when variable-geometry ducted fan 200 is in the vertical-flight orientation.

Referring to FIG. 5, as one example, duct wall 216 includes inner wall 220 and outer wall 222. Duct inlet lip 218 extends between inner wall 220 and outer wall 222 at inlet end 208. As one example, inner wall 220 may include inner wall transition-portion 224 defining a portion or section of inner wall 220 proximate (e.g., at or near) inlet 206. Inner wall transition-portion 224 extends from highlight point 278 of duct inlet lip 218 to throat point 280 of inner wall 220. Inner wall transition-portion 224 includes length $L_5$ measured along the longitudinal axis of air duct 202. As one specific, non-limiting example, the ratio of inner wall transition-portion length $L_5$ to overall duct length $L_1$ (e.g., $L_5/L_1$) may be approximately 0.120.

Similarly, outer wall 222 may include outer wall transition-portion 226 defining a portion or section of outer wall 222. Outer wall transition-portion 226 extends from highlight point 278 of duct inlet lip 218 to a position of maximum thickness T of air duct 202. Outer wall transition-portion 226 includes a length $L_6$ measured along the longitudinal axis of air duct 202. As one specific, non-limiting example, the ratio of outer wall transition-portion length $L_6$ to overall duct length $L_1$ (e.g., $L_6/L_1$) may be approximately 0.297.

Duct inlet lip 218 may define inlet 206 (e.g., forms a perimeter of the inlet aperture or opening of air duct 202). Duct inlet lip 218 extends between inner wall transition-portion 224 and outer wall transition-portion 226. The geometry of duct inlet lip 218 may include a curve with a constant radius-of-curvature or a curve with varying radii. Duct inlet lip 218 includes radius-of-curvature $R_1$ at the highlight position (e.g., at highlight points 278) (FIG. 5). Inner wall transition-portion 224 of duct inlet lip 218 includes radius-of-curvature $R_2$ at the throat (e.g., at throat points 280) (FIG. 5) of air duct 202 (of variable-geometry ducted fan 200).

The geometry of inner wall transition-portion 224 proximate duct inlet lip 218 (e.g., inlet end 208) of variable-geometry ducted fan 200 (or air duct 202) is characterized as a combination of the geometry of duct inlet lip 218 proximate (e.g., at or near) highlight points 278 (e.g., radius $R_1$) and the geometry of inner wall transition-portion 224 proximate throat points 280 (e.g., radius $R_2$), and is generally referred to herein as a rounding radius $R_3$ (not explicitly illustrated in FIG. 5). The rounding radius $R_3$ is a general parameter used to describe the inlet shape of variable-geometry ducted fan 200 (or air duct 202) since the curvature varies (e.g., is continuously changing) from $R_1$ to $R_2$. The rounding radius $R_3$ may be defined by $$\sqrt[3]{R_1^2 * R_2}.$$

As one example, and as illustrated in FIG. 5, the rounding radius $R_3$ of inner wall transition-portion 224 of inlet 206 of variable-geometry ducted fan 200 (or air duct 202) may be approximately fourteen percent of the radius of fan 204 (e.g., $\frac{1}{2}D_4$).

As one example, and as best illustrated in FIG. 5, outer wall 222 may include a curved surface extending from proximate (e.g., at or near) outer wall transition-portion 226 to proximate outlet 210. Air duct 202 includes a constant inner diameter formed by inner wall 220. Inner wall 220 may include an approximately flat (in cross-section) surface extending from proximate inner wall transition-portion 224 to proximate outlet 210 to form the constant inner diameter of air duct 202.

As one example, the geometry of an exterior of duct wall 216 (e.g., of a portion of duct inlet lip 218 and outer wall 222), for example, from the approximate center of duct inlet lip 218 to the point of maximum thickness T (e.g., a cross-sectional thickness of duct wall 216), is designed to minimize local super-velocities under transonic conditions, for example, at a design flight Mach number of approximately 0.55. As one example, a ratio of the maximum thickness T to the overall length $L_1$ (e.g., $T/L_1$) of variable-geometry ducted fan 200 is approximately 0.155.

The particular values for radius $R_1$ and radius $R_2$ (e.g., the contour shape of the duct inlet—duct inlet lip 218 and inner wall transition-portion 224, respectively) may be optimized for performance in the vertical-flight mode (e.g., hover) and horizontal-flight mode (e.g., cruise), as well as suitable inflow conditions during a transition between vertical and horizontal flight. Evaluation parameters used to optimize the geometry of duct inlet lip 218 and inner wall transition-portion 224 may include, but are not limited to, hover thrust augmentation ratio, thrust distribution between both an inner wall side and an outer wall side of duct inlet lip 218, and the like.

Referring to FIG. 4, and with reference to FIG. 3, as one example, fan 204 is rotatably mounted within air duct 202 rearward (e.g., downstream) of inlet 206 (e.g., duct inlet lip 218). Fan 204 may include any suitable air mover that draws air into air duct 202 through inlet 206 of air duct 202 and exits air through outlet 210 of air duct 202. As one example, fan 204 is configured to operate at one rotational speed, for example corresponding to a rotational tip Mach number, for example, of approximately 0.60 (e.g., 0.608), when referenced to sea level and standard day conditions, and in one rotation direction to draw air into air duct 202. As one example, fan 204 may be a low-pressure-ratio ducted fan (e.g., having a pressure ratio of approximately 1.04).

Fan 204 includes rotor 230 and fan (or rotor) blades 232 (e.g., a plurality of fan blades 232) attached to rotor 230. Fan 204 includes the fan diameter $D_4$. The diameter $D_4$ of fan 204 defines a fan area $A_4$ (not explicitly illustrated) of variable-geometry ducted fan 200. Each fan blade 232 includes blade geometry (not explicitly illustrated). The blade geometry includes a blade length, a blade thickness (e.g., a maximum and a minimum thickness), a blade chord $C_1$ (e.g., a maximum and a minimum chord width), and the like. As one example, the blade geometry of fan blade 232 may vary, for example, along the blade length. As one specific, non-limiting example, the ratio of blade thickness to blade chord (e.g., thickness-to-chord ratio) may vary, for example, from approximately 0.04 proximate (e.g., at or near) a distal end of fan blade 232 (e.g., at the tip) to approximately 0.155 proximate a proximal end of fan blade 232 (e.g., at rotor 230).

As one example, each fan blade 232 may include a twist over the blade length. For example, fan blade 232 may twist from proximate the proximal end of fan blade 232 to proximate the distal end of fan blade 232. As one specific, non-limiting example, the blade twist may be approximately 36 degrees and may vary non-linearly along the blade length. As those skilled in the art will recognize, the blade twist may be configured or adjusted to optimize air loading on fan blade 232 and/or to tailor air-loading distribution to achieve desired induced velocities and/or swirl distributions in wake of the exhaust.

As one example, the blade geometry also includes blade solidity. The blade solidity is defined by a ratio of blade area (e.g., the blade length×the blade chord×the number of blades) to fan area ($\Pi r^2$ of fan 204–$\Pi r^2$ of hub 238 (or nose 240)). As one specific, non-limiting example, the blade solidity may be approximately 0.56. The particular blade solidity may vary depending upon various factors including, but not limited to, fan speed, exit area ratio, blade operating lift coefficient, operating speeds, overall desired thrusts, and the like.

As one specific, non-limiting example, fan 204 includes eight fan blades 232. However, other numbers of fan blades 232 (e.g., less than eight or more than eight) are also contemplated without limitation. Those skilled in the art will recognize that the number of fan blades 223 and/or the blade chord of each fan blade 232 may depend on a variety of factors including, but not limited to, the fan area $A_4$, an exhaust (e.g., exit) area $A_5$ (not explicitly illustrated), the fan speed, the fan design (e.g., blade geometry) and the like.

As one example, fan blades 232 may be variable pitch fan blades. Each one of fan blades 232 may articulate (e.g., rotate) along a lengthwise axis relative to rotor 230. As one example, all of fan blades 232 may be movably (e.g., rotatably) coupled to rotor 230 and may rotate together. Varying the pitch of fan blades 232 may vary the thrust produced by variable-geometry ducted fan 200 while fan 204 is operating at a fixed rotational speed. As one example, fan blades 232 may be oriented at a low pitch for vertical flight or low-speed horizontal flight and fan blades 232 may be oriented at a high pitch for high-speed horizontal flight.

Figure 6:
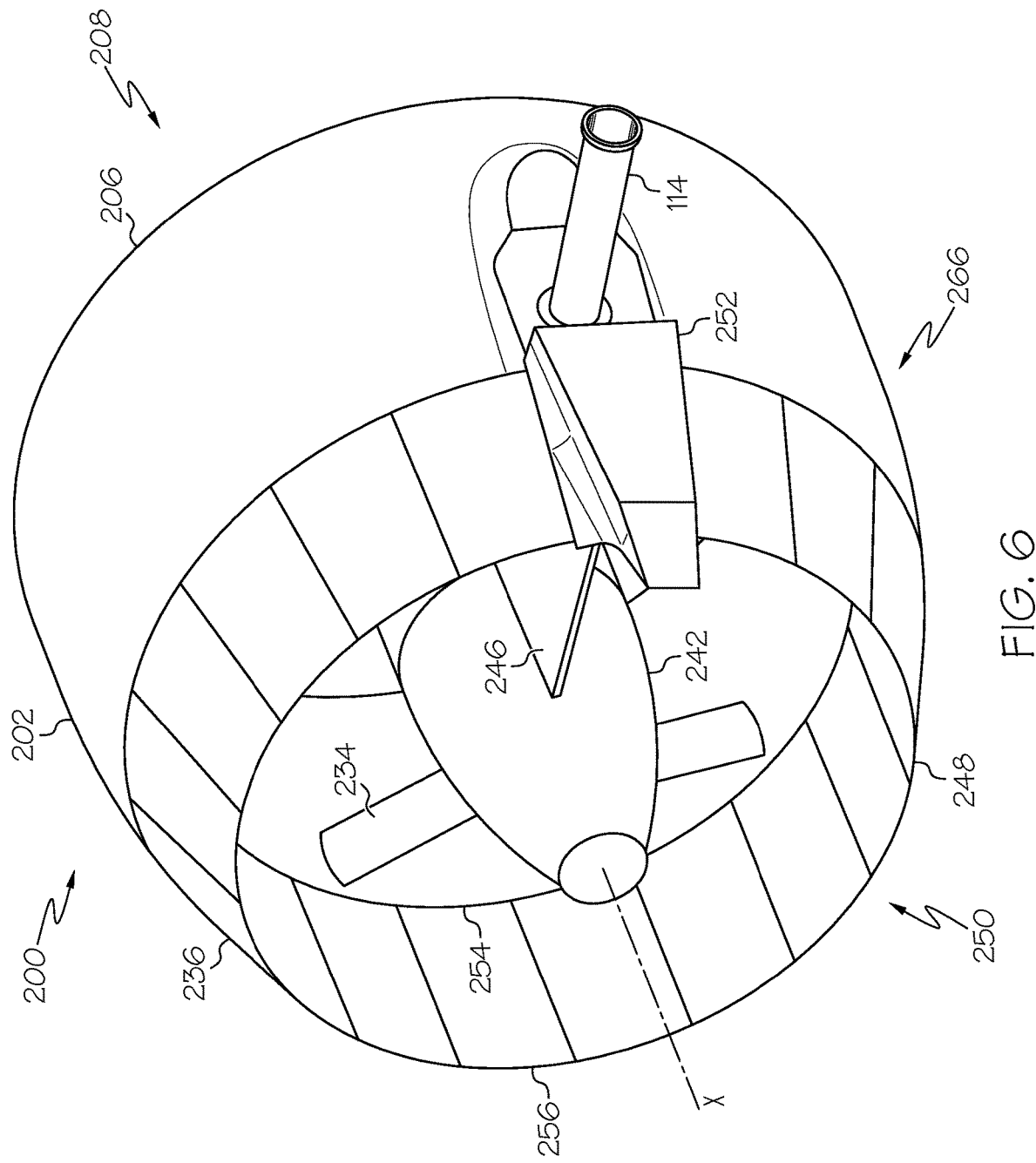
FIG. 6 is a schematic rear perspective view of one example of the disclosed variable-geometry ducted fan shown with one example of a variable-area nozzle contracted to decrease an exhaust area of the disclosed variable-geometry ducted fan.

Referring to FIG. 4 and with reference to FIGS. 3 and 6, as one example, variable-geometry ducted fan 200 includes hub 238 located inside air duct 202. Hub 238 may serve as an attachment point for fan 204. As one example, rotor 230 may be rotatably coupled to hub 238.

As one example, variable-geometry ducted fan 200 includes stators 234 (e.g., a plurality of stators 234). Stators 234 may be located inside of air duct 202 rearward (e.g., downstream) of fan 204. Stators 234 may extend radially from hub 238 to air duct 202. As one example, each one of stators 234 may be fixedly coupled to hub 238 and to duct wall 216 (e.g., inner wall 220) of air duct 202. As one specific, non-limiting example, variable-geometry ducted fan 200 includes nine stators 234. However, other numbers of stators 234 (e.g., less than nine or more than nine) are also contemplated without limitation. Those skilled in the art will recognize that the number of stators 234 may depend on a variety of factors including, but not limited to, the number of fan blades 232, the fan speed, the fan design (e.g., blade geometry) and the like.

Referring to FIG. 5, and with reference to FIG. 4, the location or position of fan 204, for example, relative to inlet 206 of variable-geometry ducted fan 200, may be optimized to create uniform inlet airflow into fan 204. As one example, fan blades 232 (e.g., a fan plane shared by fan blades 232) may be located at a position at least 25 percent of the overall length $L_1$ of variable-geometry ducted fan 200 downstream from inlet 206. As one example, fan blades 232 (e.g., the fan plane shared by fan blades 232) may be located at a position approximately 25 percent of the overall length $L_1$ of variable-geometry ducted fan 200 downstream from inlet 206. Other positions of fan 204 relative to inlet 206 of variable-geometry ducted fan 200 are also contemplated.

Stators 234 may be positioned in proximity to fan 204 (e.g., fan blades 232). The location or position of stators 234, for example, relative to inlet 206 of variable-geometry ducted fan 200 or to fan blades 232, may be optimized to minimize noise and/or vibration. As one example, stators 234 (e.g., a stator plane shared by stators 234) may be located at a position approximately 50 percent of the overall length $L_1$ of variable-geometry ducted fan 202 downstream from inlet 206. As one example, stators 234 (e.g., a stator plane shared by stators 234 or a forward end of stators 234) may be located a minimum distance $L_4$ downstream from fan blades 232 (e.g., the fan plane shared by fan blades 232 or an aft end of fan blades 232). As one specific, non-limiting example, the minimum distance $L_4$ may be approximately equal to the blade chord $C_1$ dimension of fan blade 232.

Each stator 234 includes stator geometry (not explicitly illustrated). The stator geometry includes a stator thickness (e.g., a maximum and a minimum thickness), a stator chord $C_2$ (e.g., a maximum and a minimum chord width), a stator twist, and the like. As one example, each stator 234 may include a twist over the stator length. For example, stator 234 may twist from proximate a proximal end of stator 234 (e.g., at hub 238) to proximate a distal end of stator 234 (e.g., at inner wall 220). As one specific, non-limiting example, the stator twist may be approximately 4 degrees and may vary non-linearly along the blade length. As those skilled in the art will recognize, the stator twist may be configured or adjusted to accommodate the swirl velocities induced by fan blades 232.

Fan blades 232 and stators 234 are designed to have a predetermined loading distribution that achieves a particular wake condition of air exiting variable-geometry ducted fan 200 (e.g., exhaust). Fan blades 232 and stators 234 are designed to minimize radial airflow and/or air swirl (e.g., exhaust losses) and maximize aerodynamic efficiency. As one example, fan blades 232 and stators 234 are designed to have a free-vortex tangential velocity distribution to achieve radial equilibrium such that there is no radial airflow in the wake, for example, at high-speed conditions. For example, stators 234 may be used to remove the swirl (or flow rotation) introduced by fan 204 as it pushes the air through air duct 202. Removing the swirl improves the fan aerodynamic performance by converting the flow swirl energy into thrust.

Referring to FIG. 4, and with reference to FIG. 3, as one example, variable-geometry ducted fan 200 may also include nose 240. Nose 240 may cover rotor 230. Thus, nose 240 and hub 238 may form center body 242 of variable-geometry ducted fan 200. Fan blades 232 and stators 234 may extend radially from center body 242. Center body 242 includes diameter $D_3$ (e.g., a maximum diameter of hub 238 and/or nose 240). The diameter $D_3$ of center body 242 defines cross-sectional center body area $A_3$ (not explicitly illustrated). As one specific, non-limiting example, the center body diameter $D_3$ may define approximately thirty percent of the fan diameter $D_4$ (e.g., the center body area $A_3$ may define approximately thirty percent of the fan area $A_4$).

Referring to FIG. 2, one example of drive system 110 for variable-geometry ducted fan 200 is disclosed. Drive system 110 may include at least one engine 112 operatively coupled to fan 204 of variable-geometry ducted fan 200. Engine 112 may be located within vehicle body 102 (e.g., fuselage 108) of aircraft 100. As one example, and as best illustrated in FIG. 2, a single engine 112 may power (e.g., drive) every variable-geometry ducted fan 200 of aircraft 100. As one example (not explicitly illustrated), each variable-geometry ducted fan 200 may be powered (e.g., driven) by its own engine 112.

Referring to FIGS. 2 and 4, as one example, drive system 110 includes at least one drive shaft 114 coupled between engine 112 and fan 204 of variable-geometry ducted fan 200. Drive system 110 may also include at least one gear box 116 to provide speed and/or torque conversions from engine 112, through drive shaft 114, to fan 204 of variable-geometry ducted fan 200. As illustrated in FIG. 2, engine 112 is coupled to two drive shafts 114, for example, via at least one gear box 116. As illustrated in FIG. 4, each drive shaft 114 is coupled to fan 204 of variable-geometry ducted fan 200, for example, via at least one gear box 116. As one example, and as illustrated in FIG. 2, drive shaft 114 may extend from engine 112, through wing 104, and to fan 204. As one example, and as illustrated in FIG. 4, drive shaft 114 may extend through duct wall 216 of air duct 202 and into hub 238. Fairing 246 may extend from hub 238 to duct wall 216 and cover a portion of drive shaft 114. Fairing 246 may include a fairing geometry (e.g., shape) configured to substantially match the aerodynamic loading of stators 234. Thus, fairing 246 is one of the plurality of stators 234 of variable-geometry ducted fan 200.

Referring to FIG. 4, and with reference to FIG. 3, variable-area nozzle 236 is coupled to air duct 202 at outlet 210 (e.g., outlet end 212) of air duct 202. An approximately circular exhaust aperture or opening at exhaust end 250 of variable-area nozzle forms exhaust 248 of variable-area nozzle 236. Exhaust end 250 is also the exhaust end of variable-geometry ducted fan 200. Exhaust 248 is also the exhaust of variable-geometry ducted fan 200. Fan 204 draws air into variable-geometry ducted fan 200 through inlet 206 and exits air through exhaust 248.

Variable-area nozzle 236 includes a variable (e.g., exhaust) diameter $D_5$ at exhaust 248. The diameter $D_5$ of exhaust 248 defines the exhaust area $A_5$ (not explicitly illustrated) of variable-geometry ducted fan 200. Thus, as the diameter $D_5$ of exhaust 248 increases, so does the exhaust area $A_5$ of variable-geometry ducted fan 200. Similarly, as the diameter $D_5$ of exhaust 248 decreases, so does the exhaust area $A_5$ of variable-geometry ducted fan 200. As one example, when variable-geometry ducted fan 200 is in the vertical-flight mode (e.g., hover) (FIG. 1), the diameter $D_5$ of variable-area nozzle 236 is greater than the diameter $D_4$ of fan 204 and, thus, the exhaust area $A_5$ is greater than the fan area $A_4$. As one example, when variable-geometry ducted fan 200 is in the horizontal-flight mode (e.g., cruise) (FIG. 2), the diameter $D_5$ of variable-area nozzle 236 is less than the diameter $D_4$ of fan 204 and, thus, the exhaust area $A_5$ is less than the fan area $A_4$. As one specific, non-limiting example, when variable-geometry ducted fan 200 is in the vertical-flight mode, the ratio of exhaust area $A_5$ to fan area $A_4$ (e.g., exhaust area-to-fan area ratio) is approximately 0.98. As one specific, non-limiting example, when variable-geometry ducted fan 200 is in the horizontal-flight mode, the ratio of exhaust area $A_5$ to fan area $A_4$ is approximately 1.30.

Figure 7:
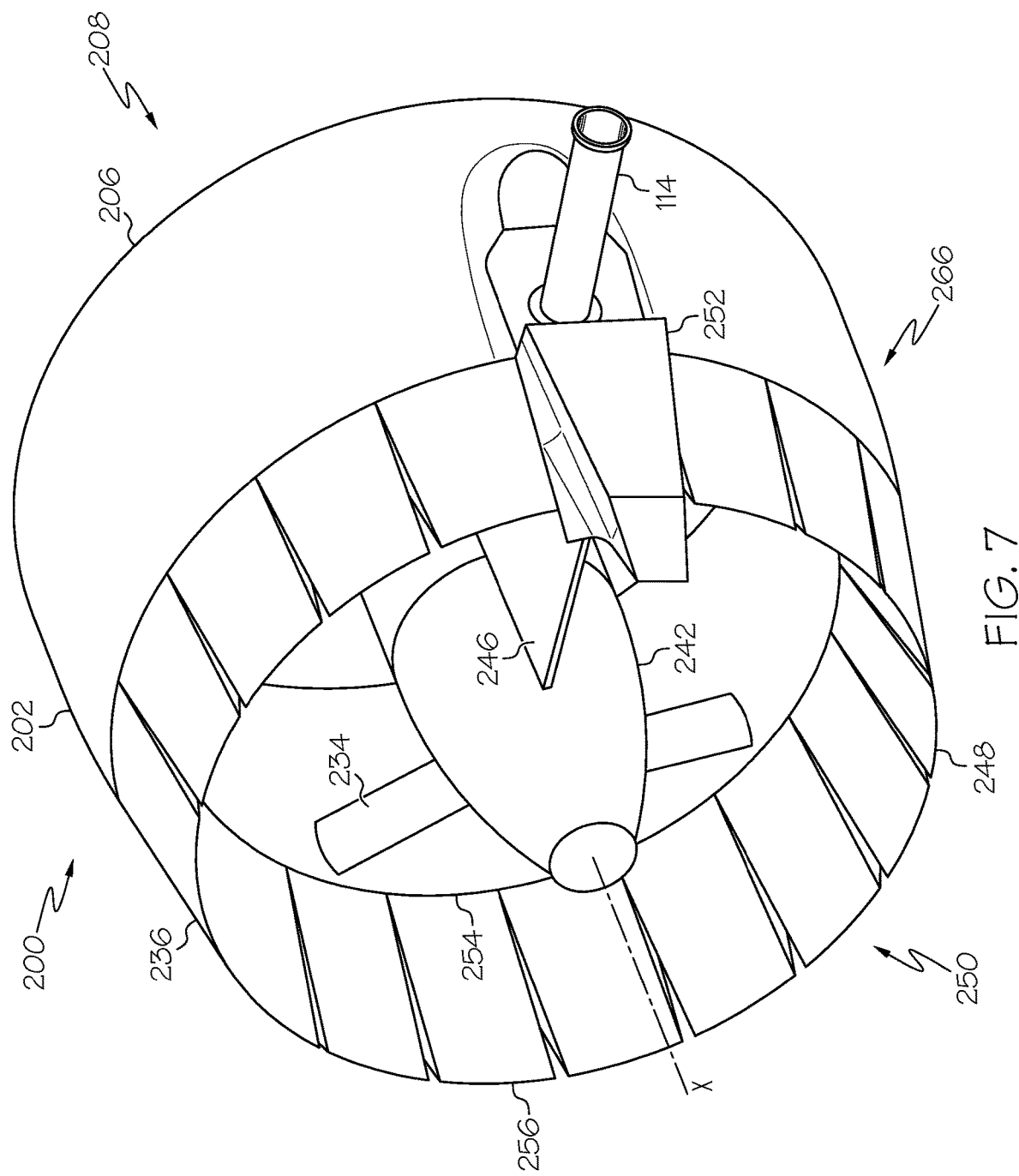
FIG. 7 is a schematic rear perspective view of one example of the disclosed variable-geometry ducted fan shown with one example of the variable-area nozzle expanded to increase the exhaust area of the disclosed variable-geometry ducted fan.

Referring to FIGS. 6 and 7, and with reference to FIGS. 3 and 4, as one example, variable-area nozzle 236 expands radially outward when variable-geometry ducted fan 200 in the vertical-flight mode, as illustrated in FIG. 7. As one example, variable-area nozzle 236 contracts radially inward when variable-geometry ducted fan 200 in the horizontal-flight mode, as illustrated in FIG. 6.

Referring to FIGS. 8 and 9, and with reference to FIGS. 6 and 7, variable-area nozzle 236 includes movable pedals 256 (e.g., a plurality of pedals 256). As one example, variable-area nozzle 236 includes a circumferential array of pedals 256 circumscribing the longitudinal axis X. Each pedal 256 may be pivotably coupled to air duct 202 at outlet 210. As one example, pedal 256 may be hingedly connected, for example, at hinged connection 258 (e.g., a hinge), to duct wall 216, for example, to inner wall 220 and/or to support channel (or rib) 260 of duct wall 216. As one specific, non-limiting example, variable-area nozzle 236 may include eighteen pedals 256. However, other numbers of pedals 256 are also contemplated without limitation.

Referring to FIGS. 8 and 9, as one example, when variable-geometry ducted fan 200 is in the vertical-flight mode (e.g., hover) (FIG. 1), each one of pedals 256 pivots radially outward at a non-zero first angle $G_1$ relative to a longitudinal central axis X of variable-geometry ducted fan 200, as illustrated in FIG. 9. As one example, when variable-geometry ducted fan 200 is in the horizontal-flight mode (e.g., cruise) (FIG. 2), each one of pedals 256 pivots radially inward at a non-zero second angle $G_2$ relative to the longitudinal central axis X of variable-geometry ducted fan 200, as illustrated in FIG. 8. As one specific, non-limiting example, first angle $G_1$ of pedal 256 relative to axis X, when variable-geometry ducted fan 200 is in the vertical-flight mode, may be approximately positive ten degrees (e.g., 10 degrees radially outward relative to axis X). As one specific, non-limiting example, second angle $G_2$ of pedal 256 relative to axis X, when variable-geometry ducted fan 200 is in the horizontal-flight mode, may be approximately negative three degrees (e.g., 3 degrees radially inward relative to axis X).

Each pedal 256 may include inner skin 262 and outer skin 264. Inner skin 262 may be associated with inner wall 220 of duct wall 216. Outer skin 264 may be associated with outer wall 222 of duct wall 216. Inner skin 262 and outer skin 264 may converge to a point or tip at an end of pedal 256 forming exhaust 248 (e.g., opposite air duct 202). As one example, inner skin 262 may form an approximately flat (e.g., planar) surface from outlet 210 to exhaust 248. As one example, outer skin 264 may form a curved or contoured surface from outlet 210 to exhaust 248.

As one example, when pivoted in the radially inward direction, as illustrated in FIG. 8 (e.g., when variable-geometry ducted fan 200 is in the horizontal-flight mode), outer skin 264 of pedal 256 may align with and/or abut outer wall 222 of duct wall 216 of air duct 202. When pivoted in the radially outward direction, as illustrated in FIG. 9 (e.g., when variable-geometry ducted fan 200 is in the vertical-flight mode), outer skin 264 of pedal 256 may slide underneath a portion of outer wall 222 of duct wall 216 of air duct 202.

Referring to FIGS. 6 and 7, variable-geometry ducted fan 200 includes actuation system 266. Actuation system 266 is configured to expand (FIG. 7) and retract (FIG. 6) variable-area nozzle 236 in order to increase or decrease exhaust area $A_5$ of variable-geometry ducted fan 200, respectively. Actuation system 266 may be operatively coupled to each one (e.g., all) of pedals 256 to pivot pedals 256 between the radially outward position (FIG. 9) and the radially inward position (FIG. 8) in order to increase or decease exhaust area $A_5$ of variable-geometry ducted fan 200, respectively. Various different mechanisms may be used as actuation system 266 to radially pivot pedals 256 inward and outward.

Figure 10:
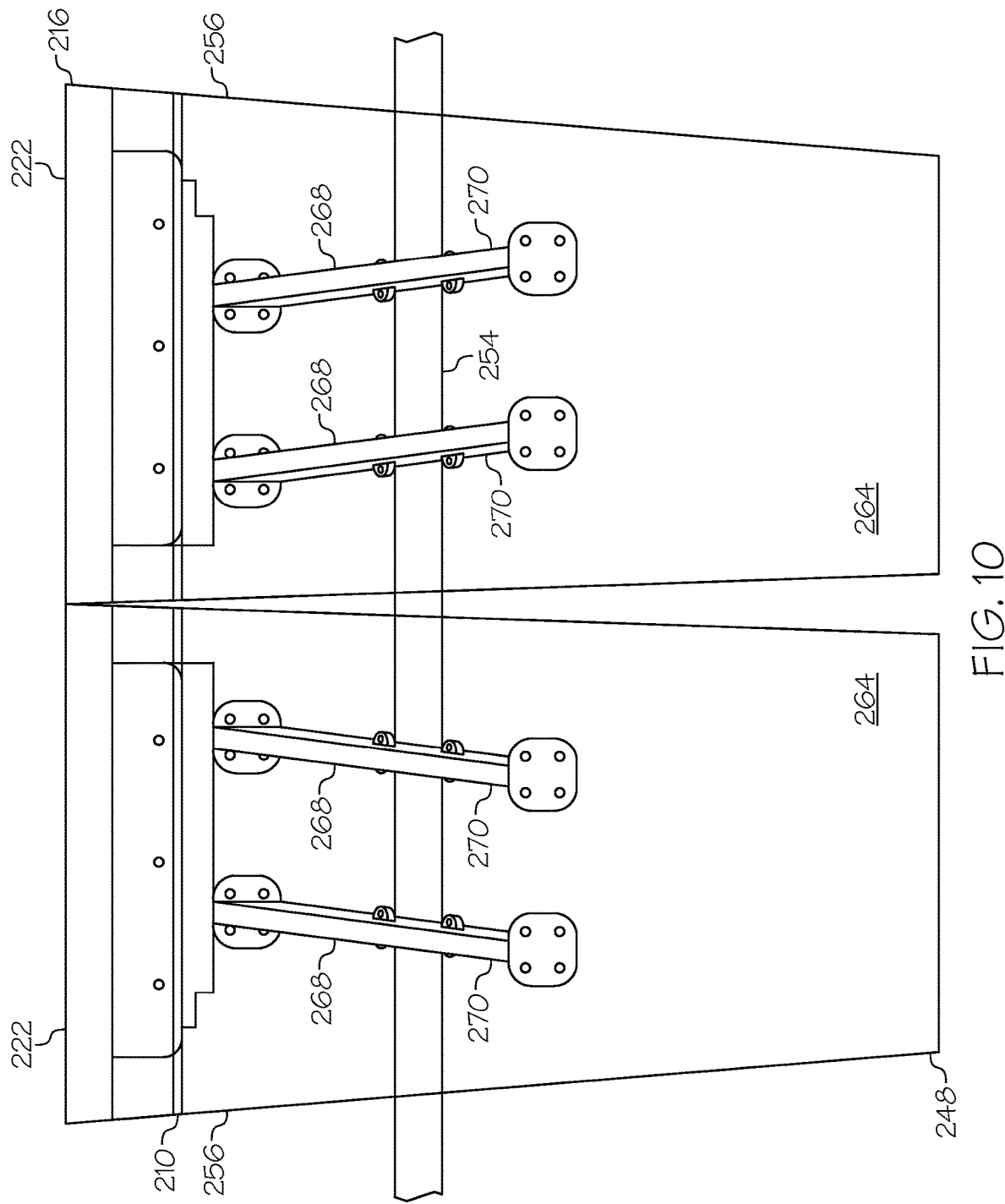
FIG. 10 is a schematic top perspective view of two pedals of the variable-area nozzle of the disclosed variable-geometry ducted fan.

Referring to FIGS. 8-10, and with reference to FIGS. 6 and 7, as one example, each one of pedals 256 includes at least one moment arm 268 rigidly coupled between inner skin 262 and outer skin 264. Moment arm 268 may provide structural support to and maintain the shape of pedal 256. Actuation system 266 (FIGS. 6 and 7) may be operatively coupled to moment arm 268 to move (e.g., pivot) pedal 256 between the radially outward position and the radially inward position.

As one example, actuation system 266 includes actuator 252 and actuating ring 254. Actuator ring 254 may extend concentrically around (e.g., circumscribe) the longitudinal axis X and/or circumferentially around variable-area nozzle 236. Expansion of actuating ring 254 expands variable-area nozzle 236, when variable-geometry ducted fan 200 is in the vertical-flight mode. Contraction of actuating ring 254 contracts variable-area nozzle 236, when variable-geometry ducted fan 200 is in the horizontal-flight mode.

As one example, pedal 256 includes ring fitting 270 that is coupled to moment arm 268. Actuating ring 254 may be coupled to ring fitting 270. As one example, ring fitting 270 includes ring opening (or aperture) 272. Actuating ring 254 extends circumferentially around pedals 256 forming variable-area nozzle 236 and through ring opening 272 of each one of pedals 256. Expansion of actuating ring 254 pivots pedals 256 radially outward (via application of a radial force upon moment arm 268), when variable-geometry ducted fan 200 is in the vertical-flight mode. Contraction of actuating ring 254 pivots pedals 256 radially inward (via application of a radial force upon moment arm 268), when variable-geometry ducted fan 200 is in the horizontal-flight mode.

Figure 11:
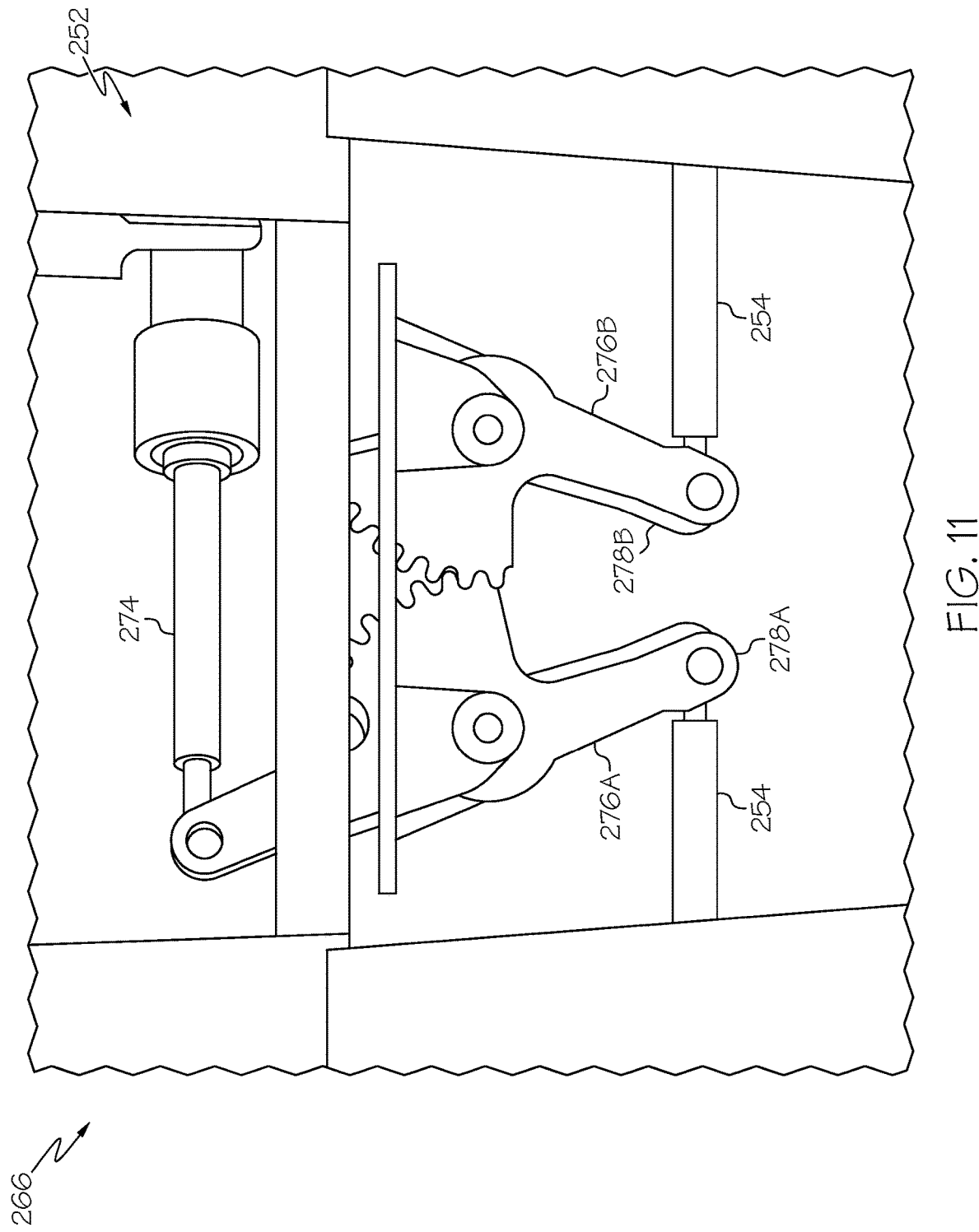
FIG. 11 is a schematic partial, side elevation view of one example of an actuation system of the disclosed variable-geometry ducted fan.

Referring to FIG. 11, and with reference to FIGS. 6-10, actuator 252 may expand and contract actuating ring 254 relative to the longitudinal axis X. Actuator 252 may be any suitable mechanical actuation device, electric actuation device, pneumatic actuation device, hydraulic actuation device, or a combination thereof. As one example, actuator 252 may include piston 274. Piston 274 may be coupled to an operatively interconnected pair of actuating linkages (e.g., first actuating linkage 276A and second actuating linkage 276B). Each one of actuating linkages 276A and 276B may be coupled to an end (e.g., first end 278A and second end 278B) of actuating ring 254. As one example, piston 274, first actuating linkage 276A, and second actuating linkage 276B may form a scissor-linkage assembly, such that linear actuation of piston 274 drives ends of first actuating linkage 276A and second actuating linkage 276B together and apart, thereby driving first end 278A and second end 278B of actuating ring 254 together and apart in order to contract and expand actuating ring 254, respectively.

While only one particular example actuation system 266 (e.g., actuator 252 and actuating ring 254) has been described and illustrated in FIGS. 8-11, various other types of actuation mechanisms are contemplated and may be used with equal effect and benefit. As one example (not explicitly illustrated), actuation system 266 may include one or more actuators operatively coupled to one or more of pedals 256.

Accordingly, the disclosed variable-geometry ducted fan 200 for VTOL aircraft 100 provides a variable area exhaust 248 configured to optimize fan air inflow and achieve high efficiency thrust in both high-speed and low-speed flight. Variable-area nozzle 236 expands in the vertical-flight mode by pivoting a circumferential array of pedals 256 radially outward to maximize the exhaust area $A_5$ of variable-geometry ducted fan 200 to generate and utilize thrust from both air duct 202 and fan 204, thereby beneficially increasing performance in the vertical-flight mode. Variable-area nozzle 236 contracts in the horizontal-flight mode by pivoting a circumferential array of pedals 256 radially inward to minimize the exhaust area $A_5$ of variable-geometry ducted fan 200 to generate and utilize thrust from fan 204, thereby beneficially increasing performance in the horizontal-flight mode. Reduction of the exhaust area $A_5$ of variable-geometry ducted fan 200, when in the horizontal-flight mode, may beneficially enable operation at high-speeds, for example, at speeds up to approximately 350 knots (a flight Mach of approximately 0.55) by limiting a blade tip Mach number and avoiding adverse fan compressibility effects.

The disclosed variable-geometry ducted fan 200 may also beneficially achieve a hover thrust augmentation ratio of approximately 2.43. As used herein, the hover thrust augmentation ratio is defined as the combined sum of fan thrust and duct thrust divided by the fan thrust under static (e.g., hover) conditions.

The disclosed variable-geometry ducted fan 200 also includes a number and configuration of fan blades 232 and stators 234 designed to have a free-vortex tangential velocity distribution in order to beneficially achieve radial equilibrium in the exhaust wake. The design of fan 204 (e.g., fan blades 232) and stators 234 may eliminate radial and tangential flow in the exhaust wake at design conditions in order to maximize horizontal flight propulsive efficiency. As one example, in the horizontal-flight mode of operation, the disclosed variable-area ducted fan 200 may beneficially achieve a maximum net propulsive efficiency of approximately 0.80.

Referring to FIG. 12, and with reference to FIGS. 1-11, one embodiment of method 500 for increasing aerodynamic efficiency of aircraft 100 in the vertical-flight mode and the horizontal-flight mode using variable-geometry ducted fan 200 is disclosed. Modifications, additions, or omissions may be made to method 500 without departing from the scope of the present disclosure. Method 500 may include more, fewer, or other steps. Additionally, steps may be performed in any suitable order.

In one example implementation, method 500 may include the step of providing aircraft 100 with at least one variable-geometry ducted fan 200, as shown at block 502. Method 500 may include the steps of positioning variable-geometry ducted fan 200 in one of the approximately vertical orientation, as shown at block 504, or the approximately horizontal orientation, as shown at block 506.

In one example implementation, method 500 may include the step of expanding variable-area nozzle 236 relative to the longitudinal axis X of variable-geometry ducted fan 200 to increase the exhaust area $A_5$ of exhaust 248 when variable-geometry ducted fan 200 is in the approximately vertical orientation (block 504) for vertical flight, as shown at block 508.

As described above, expanding variable-area nozzle 236 relative to the longitudinal axis X of variable-geometry ducted fan 200 (block 508) may include pivoting pedals 256 radially outward relative to the longitudinal axis X of variable-geometry ducted fan 200 to increase the exhaust area $A_5$ of exhaust 248.

Alternatively, in one example implementation, method 500 may include the step of contracting variable-area nozzle 236 relative to the longitudinal axis X of variable-geometry ducted fan 200 to decrease the exhaust area $A_5$ of exhaust 248 when variable-geometry ducted fan 200 is in the approximately horizontal orientation (block 506) for horizontal flight, as shown at block 510.

As described above, contracting variable-area nozzle 236 relative to the longitudinal axis X of variable-geometry ducted fan 200 (block 510) may include pivoting pedals 256 radially inward relative to the longitudinal axis X of variable-geometry ducted fan 200 to decrease the exhaust area $A_5$ of exhaust 248.

In one example implementation, method 500 may include the step of drawing air into variable-geometry ducted fan 200 through inlet 206, as shown at block 512. Method 500 may include the step of moving air through variable-area nozzle 236, as shown at block 514. Method 500 may include the step of exiting air from variable-geometry ducted fan 200 through exhaust 248 to generate thrust suitable to enable one of the vertical flight or the horizontal flight depending upon the orientation of variable-geometry ducted fan 200, as shown at block 516.

In one example implementation, method 500 may include the step of transitioning variable-geometry ducted fan 200 from the approximately horizontal orientation to the approximately vertical orientation, as shown at block 518. Upon positioning variable-geometry ducted fan 200 in the approximately vertical orientation, the steps shown at blocks 508, 512, 514 and 516 may be repeated for vertical flight.

Alternatively, in one example implementation, method 500 may include the step of transitioning variable-geometry ducted fan 200 from the approximately vertical orientation to the approximately horizontal orientation, as shown at block 520. Upon positioning variable-geometry ducted fan 200 in the approximately horizontal orientation, the steps shown at blocks 510, 512, 514 and 516 may be repeated for horizontal flight.

Examples of the present disclosure may be described in the context of aircraft manufacturing and service method 1100 as shown in FIG. 13 and aircraft 1200 as shown in FIG. 14. Aircraft 1200 may be one example of aircraft 100 illustrated in FIGS. 1 and 2.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Variable-geometry ducted fan 200 and drive system 110 (FIGS. 1-11) disclosed herein may be examples of propulsion system 1208. Any number of other systems may be included.

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and methods, or combination thereof may be utilized during production stages (blocks 1108 and 1110), for example, by providing variable-geometry ducted fans 200 that achieve high aerodynamic efficiency in both the vertical-flight mode (e.g., hover) and the horizontal-flight mode (e.g., high-speed cruise) of a VTOL aircraft. Similarly, one or more examples of the apparatus and methods, or a combination thereof, may be utilized, for example and without limitation, while aircraft 1200 is in service (block 1112) and during maintenance and service stage (block 1114).

Although various examples of the disclosed apparatus and methods have been shown and described, modifications may occur to those skilled in the art upon reading the specification. The present application includes such modifications and is limited only by the scope of the claims.

What is claimed is:

1. A variable-geometry ducted fan comprising:
an air duct having a longitudinal axis, said air duct comprising an inlet of said variable-geometry ducted fan;
a fan rotatably mounted within said air duct downstream from said inlet, said fan comprising fan blades defining a fan area;
a variable-area nozzle coupled to said air duct downstream from said fan, said variable-area nozzle comprising an exhaust of said variable-geometry ducted fan having a variable exhaust area, wherein said variable-area nozzle comprises a circumferential array of pedals, wherein a first pedal of the circumferential array of pedals comprises a first inner skin and a first outer skin, wherein said first pedal includes a first moment arm rigidly coupled between said first inner skin and said first outer skin and a first ring fitting coupled to said first moment arm, said first ring fitting encircling an first opening,
wherein a second pedal of the circumferential array of pedals comprises a second inner skin and a second outer skin, wherein said second pedal includes a second moment arm rigidly coupled between said second inner skin and said second outer skin and a second ring fitting coupled to said second moment arm, said second ring fitting encircling a second opening; and
an actuation system, said actuation system comprising:
an actuator ring passing through said first opening and through said second opening, wherein said actuator ring extends circumferentially around said variable-area nozzle, wherein expansion of said actuator ring expands said variable-area nozzle and contraction of said actuator ring contracts said variable-area nozzle; and
an actuator that drives expansion and contraction of said actuator ring.

2. The variable-geometry ducted fan of claim 1 wherein said variable-area nozzle expands relative to said longitudinal axis to increase said exhaust area of said exhaust for vertical flight.

3. The variable-geometry ducted fan of claim 2 wherein a ratio of said exhaust area to said fan area is approximately 1.30.

4. The variable-geometry ducted fan of claim 1 wherein said variable-area nozzle contracts relative to said longitudinal axis to decrease said exhaust area for horizontal flight.

5. The variable-geometry ducted fan of claim 4 wherein a ratio between said exhaust area and said fan area is approximately 0.98.

6. The variable-geometry ducted fan of claim 1 wherein said circumferential array of pedals are pivotably coupled to said air duct and circumscribe said longitudinal axis.

7. The variable-geometry ducted fan of claim 6 wherein said pedals pivot radially outward relative to said longitudinal axis to increase said exhaust area of said exhaust for vertical flight.

8. The variable-geometry ducted fan of claim 7 wherein said pedals pivot radially outward at an angle of approximately positive ten degrees relative to said longitudinal axis to increase said exhaust area of said exhaust for said vertical flight.

9. The variable-geometry ducted fan of claim 6 wherein said pedals pivot radially inward relative to said longitudinal axis to decrease said exhaust area of said exhaust for horizontal flight.

10. The variable-geometry ducted fan of claim 9 wherein said pedals pivot radially inward at an angle of approximately negative three degrees relative to said longitudinal axis to decrease said exhaust area of said exhaust for said horizontal flight.

11. The variable-geometry ducted fan of claim 1 wherein:
said variable-geometry ducted fan comprises an overall length,
said fan comprises a fan diameter, and
a ratio of said overall length to said fan diameter is approximately 0.875.

12. The variable-geometry ducted fan of claim 11 further comprising stators mounted within said air duct downstream from said fan blades.

13. The variable-geometry ducted fan of claim 12 wherein:
said fan blades are located at a position approximately 25 percent of said overall length of said variable-geometry ducted fan downstream from said inlet, and
said stators are located a minimum distance downstream from said fan blades approximately equal to a chord dimension of said fan blades.

14. The variable-geometry ducted fan of claim 1 wherein said first inner skin and said first outer skin converge at an end of said first pedal.

15. The variable-geometry ducted fan of claim 1 wherein said first inner skin is associated with an inner wall of said air duct, and wherein said first outer skin is associated with an outer wall of said air duct.

16. The variable-geometry ducted fan of claim 15 wherein, when pivoted in a radially inward direction, said first outer skin of said first pedal is aligned with and/or abuts with said outer wall of said air duct.

17. The variable-geometry ducted fan of claim 1 wherein said actuator comprises an electric actuation device, a pneumatic actuation device, a hydraulic actuation device, or a combination thereof.

18. The variable-geometry ducted fan of claim 1 wherein said actuator drives a first end and a second end of said actuating ring together and apart in order to contract and expand said actuating ring, respectively.

19. The variable-geometry ducted fan of claim 18 wherein said actuator comprises:
a first actuating linkage coupled to said first end of said actuating ring;
a second actuating linkage coupled to said second end of said actuating ring; and
a piston coupled to said first actuating linkage and said second actuating linkage such that actuation of said piston drives said first end and said second end of said actuating ring together and apart.

20. The variable-geometry ducted fan of claim 19 wherein said first actuating linkage, said second actuating linkage, and said piston form a scissor-linkage assembly.

21. The variable-geometry ducted fan of claim 1 wherein said first ring fitting is positioned directedly between said first inner skin and said first outer skin.

22. The variable-geometry ducted fan of claim 1 wherein said first ring fitting is rigidly coupled to said first moment arm.

23. The variable-geometry ducted fan of claim 1 wherein said an actuator ring comprises a single unitary structure passing through said first opening and through said second opening.

24. An aircraft comprising:
a vehicle body; and
at least one variable-geometry ducted fan coupled to said vehicle body, wherein said variable-geometry ducted fan is rotatable between an approximately vertical orientation and an approximately horizontal orientation, and wherein said variable-geometry ducted fan comprises:
an air duct having a longitudinal axis, said air duct comprising an inlet of said variable-geometry ducted fan;
a fan rotatably mounted within said air duct downstream from said inlet, said fan comprising fan blades defining a fan area;
a variable-area nozzle coupled to said air duct downstream from said fan, said variable-area nozzle comprising an exhaust of said variable-geometry ducted fan having a variable exhaust area, wherein said variable-area nozzle comprises a circumferential array of pedals,
wherein a first pedal of the circumferential array of pedals comprises a first inner skin and a first outer skin, wherein said first pedal includes a first moment arm rigidly coupled between said first inner skin and said first outer skin and a first ring fitting coupled to said first moment arm, said first ring fitting encircling an first opening,
wherein a second pedal of the circumferential array of pedals comprises a second inner skin and a second outer skin, wherein said second pedal includes a second moment arm rigidly coupled between said second inner skin and said second outer skin and a second ring fitting coupled to said second moment arm, said second ring fitting encircling a second opening; and
an actuation system, said actuation system comprising:
an actuator ring passing through said first opening and through said second opening, wherein said actuator ring extends circumferentially around said variable-area nozzle, wherein expansion of said actuator ring expands said variable-area nozzle and contraction of said actuator ring contracts said variable-area nozzle; and an actuator that drives expansion and contraction of said actuator ring.

25. The aircraft of claim 24 wherein:
said variable-area nozzle expands relative to said longitudinal axis to increase said exhaust area of said exhaust when said variable-geometry ducted fan is in said approximately vertical orientation for vertical flight of said aircraft, and
said variable-area nozzle contracts relative to said longitudinal axis to decrease said exhaust area when said variable-geometry ducted fan is in said approximately horizontal orientation for horizontal flight of said aircraft.

26. The aircraft of claim 25, wherein:
when said variable-area nozzle expands for said vertical flight, a ratio of said exhaust area to said fan area is approximately 1.30, and
when said variable-area nozzle contracts for said horizontal flight, said ratio between said exhaust area and said fan area is approximately 0.98.

27. The aircraft of claim 24 wherein said circumferential array of pedals are pivotably coupled to said air duct and circumscribe said longitudinal axis.

28. The aircraft of claim 27 wherein:
said pedals pivot radially outward relative to said longitudinal axis to increase said exhaust area of said exhaust when said variable-geometry ducted fan is in said approximately vertical orientation for vertical flight of said aircraft, and
said pedals pivot radially inward relative to said longitudinal axis to decrease said exhaust area of said exhaust when said variable-geometry ducted fan is in said approximately horizontal orientation for horizontal flight of said aircraft.

29. A method comprising:
positioning a variable-geometry ducted fan in one of an approximately vertical orientation or an approximately horizontal orientation, said variable-geometry ducted fan comprising:
an air duct comprising an inlet of said variable-geometry ducted fan;
a fan rotatably mounted within said air duct downstream from said inlet;
a variable-area nozzle coupled to said air duct downstream from said fan and comprising an exhaust of said variable-geometry ducted fan, wherein said variable-area nozzle comprises a circumferential array of pedals, wherein a first pedal of the circumferential array of pedals comprises a first inner skin and a first outer skin, wherein said first pedal includes a first moment arm rigidly coupled between said first inner skin and said first outer skin and a first ring fitting coupled to said first moment arm, said first ring fitting encircling an first opening, wherein a second pedal of the circumferential array of pedals comprises a second inner skin and a second outer skin, wherein said second pedal includes a second moment arm rigidly coupled between said second inner skin and said second outer skin and a second ring fitting coupled to said second moment arm, said second ring fitting encircling a second opening; and an actuation system, said actuation system comprising: an actuator ring passing through said first opening and through said second opening, wherein said actuator ring extends circumferentially around said variable-area nozzle, wherein expansion of said actuator ring expands said variable-area nozzle and contraction of said actuator ring contracts said variable-area nozzle; and an actuator that drives expansion and contraction of said actuator ring;

one of:
  expanding said variable-area nozzle relative to a longitudinal axis of said variable-geometry ducted fan to increase an exhaust area of said exhaust when said variable-geometry ducted fan is in said approximately vertical orientation for vertical flight; or
  contracting said variable-area nozzle relative to said longitudinal axis of said variable-geometry ducted fan to decrease said exhaust area of said exhaust when said variable-geometry ducted fan is in said approximately horizontal orientation for horizontal flight;

drawing air into said variable-geometry ducted fan through said inlet;

moving said air through said variable-area nozzle; and exiting said air from said variable-geometry ducted fan through said exhaust to generate thrust suitable to enable one of said vertical flight or said horizontal flight depending upon said orientation of said variable-geometry ducted fan.

* * * * *